(Specimens.)
G. LINDER.
THRUST BEARING FOR ELEVATORS.
No. 510,645. Patented Dec. 12, 1893.
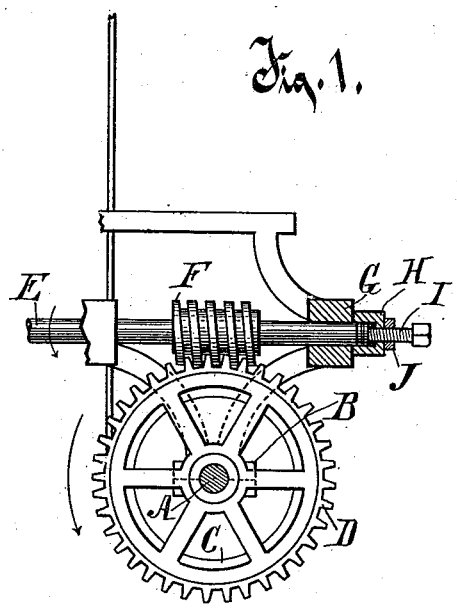
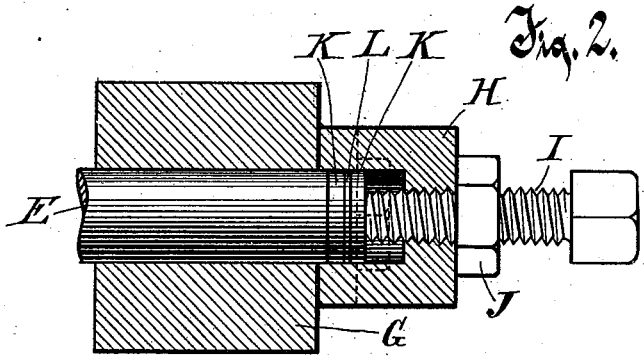
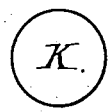
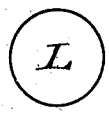
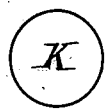
Witnesses.
Inventor.
George Linder,
By
Benedict & Morsell
Attorneys.

United States Patent Office.

GEORGE LINDER, OF MILWAUKEE, WISCONSIN, ASSIGNOR OF ONE-HALF TO FREDERICH KLEIN, OF SAME PLACE.

THRUST-BEARING FOR ELEVATORS.

SPECIFICATION forming part of Letters Patent No. 510,645, dated December 12, 1893.

Application filed February 18, 1893. Serial No. 462,812. (Specimens.)

*To all whom it may concern:*

Be it known that I, GEORGE LINDER, of Milwaukee, in the county of Milwaukee and State of Wisconsin, have invented a new and useful Improvement in Thrust-Bearings for Elevators, of which the following is a description, reference being had to the accompanying drawings, which are a part of this specification.

My invention has relation to improvements in thrust-bearings for elevators having particular reference to that class of elevators employing a worm shaft for actuating the winding drum. In this class of elevators the worm meshes with a toothed wheel fixed on the shaft of the drum on which the cable winds that lifts the elevator. In consequence of this the worm shaft is subjected to a most severe strain or pressure longitudinally which must be properly resisted in its footing or end bearing. Loose metallic disks have heretofore been employed as anti-friction bearings to receive the end pressure or thrust of the shaft, the disk being interposed between the shaft and a non-revoluble or relatively fixed support, usually an adjusting screw arranged in the prolonged line of the axis of the shaft. In such cases it has been common to tip the shaft with hardened or tool steel and to make the disk of hard tool steel turned and finished to a smooth surface; but the pressure, strain and friction are so great that such disks, even when made of the hardest steel, actually weld together and unite, or adhere to the end of the shaft, or bearing screw, or all these, becoming integral and rigid therewith, and with each other, thus loosing their capability of serving as movable anti-friction bearings for the shaft, and without the least value for the purpose intended, and even endangering the integrity of the elevator mechanism. Also leather and rawhide disks or washers have been tried, but these are ground or torn into shreds in a very short time, in some instances in less than an hour of constant use, under a moderately heavy load.

It is the primary object of my invention to provide in combination with the bearing for the end of the worm shaft, disks of a composition hereinafter specified, which will effectually obviate the disadvantages above pointed out with reference to the construction now in use, and which possess all the necessary strength to withstand the great pressure which they have to undergo.

With the above object in view the invention consists in the improved construction and combination of parts hereinafter more fully set forth.

Referring to the drawings, Figure 1, is an elevation of a fragment of the actuating mechanism of an elevator of the described class, part being in section. Fig. 2, is an enlarged sectional view of a portion of Fig. 1. Figs. 3 and 5 are detail views of the fiber disks, and Fig. 4, is a detail of the interposed metallic disk.

Like letters of reference denote like parts throughout the several views.

In the drawings, the letter A indicates a shaft having its opposite ends mounted in bearings similar to B. This shaft carries fixedly a winding drum C, and a toothed wheel D. Running transversely of shaft A is a second shaft E provided with a worm F, which meshes with the toothed wheel. The bearing for shaft E is designated by the letter G. The part G has a tubular opening or bore through which the shaft passes. A block H, forming a bearing for the extreme end of the shaft and a receptacle for the disks, is secured to the outer end of the bearing, and is provided with an adjusting screw I, the end of said screw extending into the hollow portion of the block. A jam nut J is also carried on the screw, and bears against the block.

The parts above described are common to the class of elevators upon which my invention is an improvement, and consequently no claim is made thereto, except in so far as they co-operate or combine with the elements now about to be described in producing the new and improved result. In the old form between the end of the adjusting screw and the end of the worm shaft, loose metallic disks are inserted which receive directly the longitudinal strain of the worm shaft. As above explained, the employment of metallic disks has been found open to serious objections. I have found that disks composed of compressed paper and wood pulp, or vegetable fiber suitably treated and compressed and known commercially as "gelatinized fiber" or "vulcanized fiber" can be satisfactorily used for the loose anti-friction bearings at the end of the shaft. These are not only of sufficient strength to withstand the severe pressure put on them by the end of the shaft, but continue satisfactorily as loose anti-friction bearings, and do not, like the metallic disks, weld together or become united in a solid mass. These disks are indicated by the letters K K, the inner one receiving thereagainst the pressure of the end of the worm-shaft, and the outer one receiving thereagainst the end of the adjusting screw.

Practice has demonstrated that a metallic disk interposed between the two fiber disks is desirable, and I therefore prefer to use such a disk. This disk is indicated by letter L and is shown in the detail view, Fig. 4 of the drawings, while its relative arrangement with respect to the other disks is shown in Figs. 1 and 2.

While I have shown and described two of the fiber disks, I do not wish to be understood as limiting myself to that particular number inasmuch as practice may demonstrate that more or less of these disks may be used with equally good results.

The results of the use of my improved anti-friction disk bearings, are that the great expense of tipping or capping the worm shaft with hard tool steel, and of making the hard tool steel disks, is obviated; that the disks do not adhere together, and thereby become useless and destroy the shaft and its bearings; and that a reliable loose anti-friction bearing of inexpensive construction and great endurance fills the place satisfactorily, that heretofore had been unsatisfactorily filled by what was expensive, not capable of performing the functions desired, non-enduring and in many cases dangerous.

Having thus described my invention, what I claim, and desire to secure by Letters Patent, is—

1. In a thrust-bearing for elevators, the combination with an actuating shaft and its bearing, of a bearing surface composed of hard compressed gelatinized fiber so placed as to receive the end pressure or thrust of the actuating shaft, substantially as set forth.

2. In a thrust-bearing for elevators, the combination of an actuating shaft and its bearing, an adjusting screw entering said bearing, and one or more loose disks of hard compressed gelatinized fiber interposed between the end of the shaft and the adjusting screw, adapted to receive the thrust or pressure of the shaft and the adjusting screw respectively, substantially as set forth.

3. In a thrust-bearing for elevators, the combination of an actuating shaft and its bearing, an adjusting screw entering said bearing, loose disks of hard gelatinized fiber interposed between the end of the shaft and the end of the adjusting screw, and a metallic disk between the fiber disks, substantially as set forth.

4. In a thrust-bearing for elevators, the combination of a shaft having a drum and a toothed wheel mounted fixidly thereon, a worm shaft meshing with the toothed wheel, a bearing for the end of the worm shaft, an adjusting screw entering the bearing, a jamb nut carried by said screw, and loose disks of hard gelatinized fiber within the bearing interposed between the end of the shaft and the adjusting screw, substantially as set forth.

In testimony whereof I affix my signature in presence of two witnesses.

GEORGE LINDER.

Witnesses:
ARTHUR L. MORSELL,
C. T. BENEDICT.